Jan. 17, 1956
H. R. HOGENDOBLER ET AL
2,731,066
REINFORCED FIBROUS PRODUCTS, METHOD
AND APPARATUS FOR MAKING SAME
Filed April 20, 1949
3 Sheets-Sheet 1
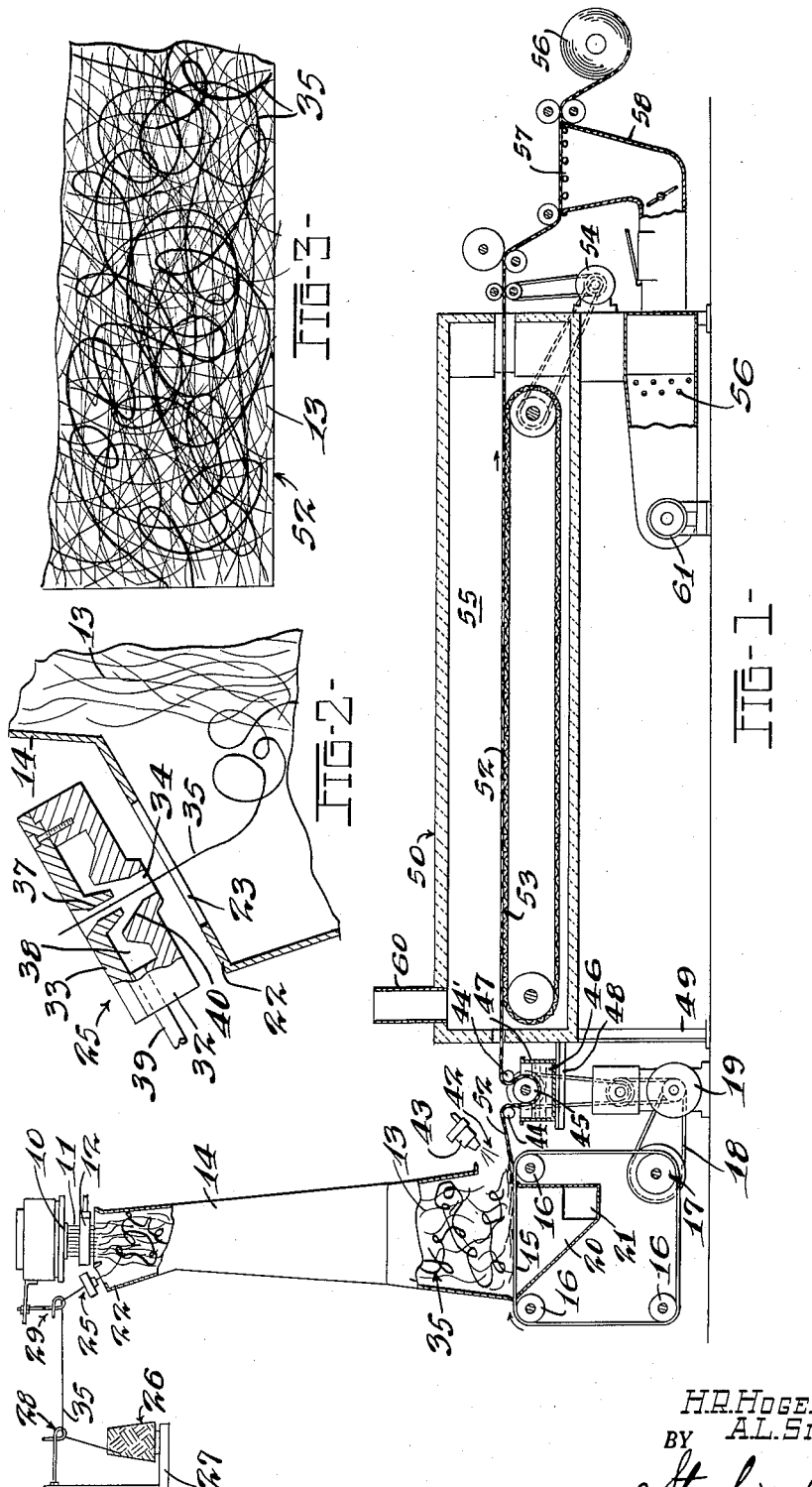
INVENTORS:
H.R.HOGENDOBLER AND
A.L.SIMISON.
BY
ATTYS.

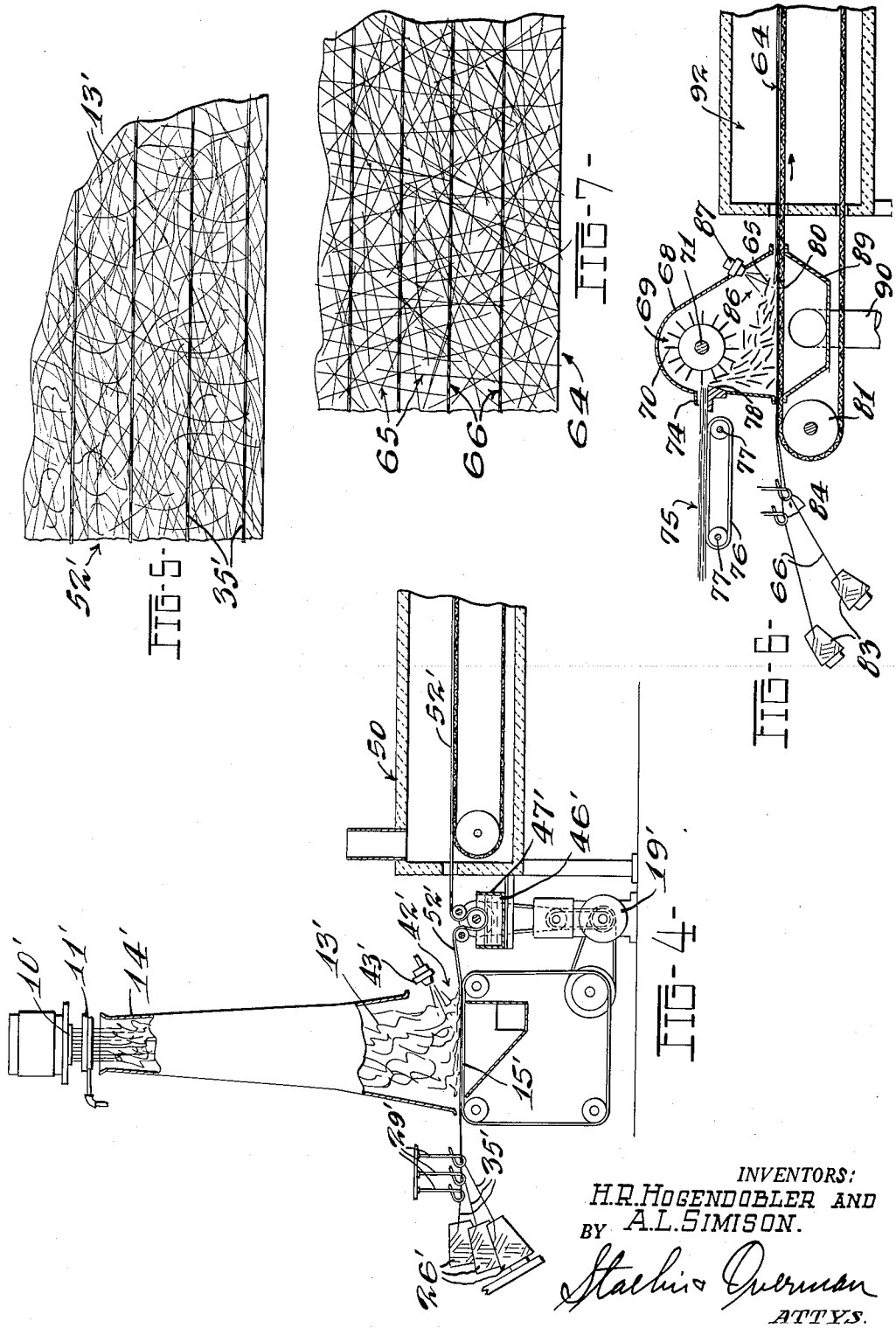

Jan. 17, 1956  H. R. HOGENDOBLER ET AL  2,731,066
REINFORCED FIBROUS PRODUCTS, METHOD
AND APPARATUS FOR MAKING SAME
Filed April 20, 1949  3 Sheets-Sheet 3
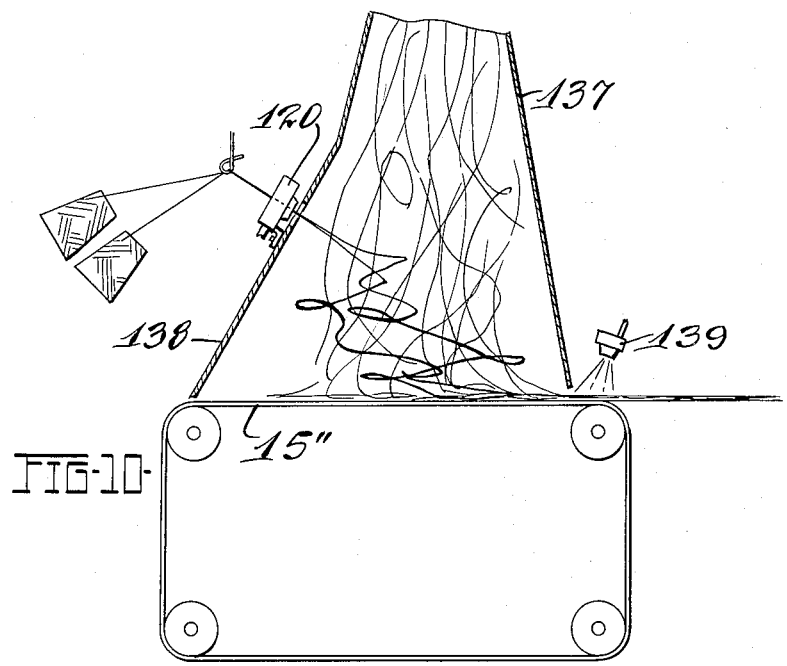
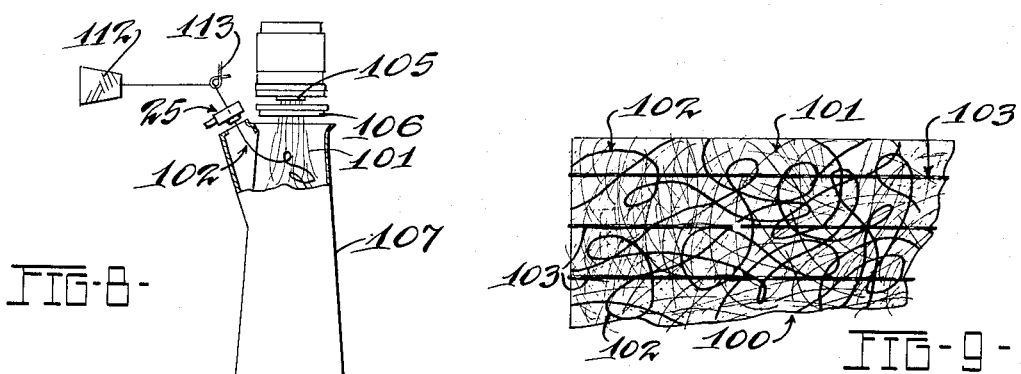
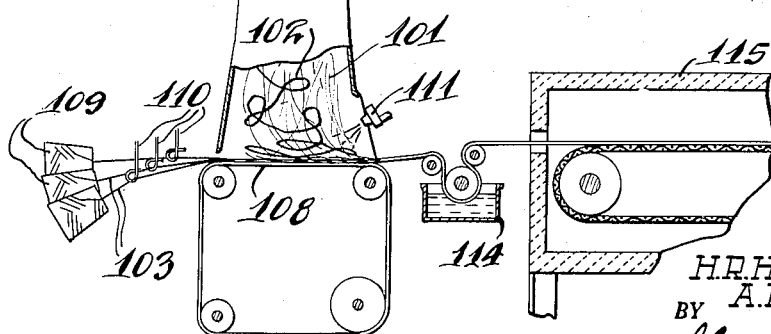
INVENTORS:
H. R. HOGENDOBLER AND
A. L. SIMISON.
BY
ATTYS.

United States Patent Office 2,731,066
Patented Jan. 17, 1956

2,731,066

REINFORCED FIBROUS PRODUCTS, METHOD AND APPARATUS FOR MAKING SAME

Henry R. Hogendobler, Toledo, and Allen L. Simison, Newark, Ohio, assignors to Owens-Corning Fiberglas Corporation, Toledo, Ohio, a corporation of Delaware Application April 20, 1949, Serial No. 88,672

35 Claims. (Cl. 154—1.76)

This invention relates to manufactured products formed of mineral fibers and strands and more especially to matted or webbed fibrous products reinforced with strand materials and to methods and apparatus for producing same.

In the manufacture of fibrous mats or sheets, it has been conventional to collect mineral or glass fibers as they are formed into a mat or sheet. The fibers are held or bonded together by an adhesive or bonding agent so as to impart integral or dimensional stability to the product. Sheets or mats of this character formed from attenuated glass fibers collected in random or haphazard formation have been manufactured for application and use as electrical insulation or dielectric purposes, for sound and heat insulation and other allied uses and applications.

While various minerals have been utilized to produce attenuated fibers or filaments by suitably drawing or attenuating the mineral material in molten condition, glass has been found to be readily susceptible for fiber and filament forming and attenuating methods. The fibers and filaments are relatively fine in diameter and may be produced by various methods, one conventional method consisting in issuing streams of molten glass from a bushing and applying jets of air or steam under comparatively high pressure to the glass streams to draw or attenuate the glass into fine fibers which solidify while entrained in the gaseous stream, the fibers so formed being of varying relatively short lengths which are collected in a mass upon a suitable surface. Such fibers produced in this manner are haphazardly arranged and follow no definite pattern during accumulation. A bonding or adhesive material may be applied to the mass of fibers and where greater densities are desired the mass is compressed by mechanical means to the thickness desired after the application of the bonding agent.

The end product heretofore produced in this fashion had insufficient tensile strength for numerous uses and applications to which it might otherwise be employed. The lack of tensile strength also presented many difficulties in handling and processing the product. Such a mass of mineral fibers so formed is incapable of properly supporting itself during some calendering or other processing operations, and if an impregnation of the fibrous mass is contemplated, the impregnated mass or web of fibers is usually unable to support its own weight and will rupture if it is carried to any height during processing.

The present invention has for an object the provision of a fabricated mass of fibrous material which is measurably stronger than fibrous mineral products which have been heretofore manufactured.

Another object of the invention is the production of a sheet or web composed of relatively fine mineral fibers reinforced with other mineral material whereby the tensile strength of the product is greatly increased as compared with conventional fibrous mats.

Another object of the invention is the fabrication of a mat formed principally of very fine fibers supplemented or reinforced with continuous strands wherein the strands and fibers are distributed in a manner to produce a finished mat of substantially uniform thickness and density.

Another object of the invention is the manufacture of a fibrous mat formed of relatively fine fibers and reinforced with continuous strands buried within the mat whereby a homogeneous matted structure is attained which is very durable, rendering it suitable for many uses, as for example, pipe wrapping, dielectric shields, or electrical insulating material.

Another object of the invention is the provision of a matted product formed of glass fibers of relatively short lengths combined with continuous strands formed of glass filaments in a manner whereby increased strength is imparted to the mat rendering the same capable of supporting itself during and after fabrication and adapting it for many and various applications of use.

Another object of the invention contemplates a method or process of manufacturing a mat or sheet by combining relatively short glass fibers with continuous strands of glass filaments in a manner whereby the continuous strands are interspersed or intermingled throughout the area of the mat and applying a cementitious or bonding agent in a manner to compact the fiber and strand structure to a relatively thin sheet-like product which is much stronger than fibrous glass mats heretofore produced.

Another object embraces the provision of a simple, yet effective and commercially practicable process of combining relatively short glass fibers with continuous glass strands, yarns or slivers in a manner such that the resulting composite product of sheet configuration is of decreased thickness and improved strength characteristics as compared with conventional mats composed of glass fibers.

A further object of the invention resides in the provision of apparatus for effectively combining continuous strands and short fibers into a matted form, and impregnating the mat with a bonding agent, the apparatus being capable of a high rate of production whereby reinforced fibrous mats made according to the present invention may be inexpensively manufactured.

Still a further object is the provision of a mat formed of relatively short glass fibers and continuous strands of glass filaments which will withstand wet impregnation processing wherein the wet strength of the mat as compared with its strength in a dry state is not materially decreased.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is an elevational semi-diagrammatic view, partially in section, illustrating an apparatus for producing reinforced fibrous sheets or mats in accordance with the principles of the present invention;

Figure 2 is a sectional view illustrating a strand feeding device forming a component of the apparatus;

Figure 3 is a plan view showing a portion of one form of mat of the present invention;

Figure 4 is a view similar to Figure 1 showing an apparatus for producing a modified form of reinforced fibrous mat structure;

Figure 5 is a plan view illustrating a fragmentary portion of mat structure produced by the apparatus illustrated in Figure 4;

Figure 6 illustrates apparatus for producing another form of fibrous mat structure of the invention;

Figure 7 is a plan view showing a portion of fibrous mat structure formed by the apparatus illustrated in Figure 6;

Figure 8 is a view of apparatus similar to the apparatus shown in Figure 1 for producing another form of reinforced fibrous mat construction;

Figure 9 is a plan view showing a form of reinforced fibrous mat structure produced by the apparatus illustrated in Figure 8; and Figure 10 is an elevational view showing a portion of a modified apparatus for producing reinforced fibrous mat structures.

Referring to the drawings and in the first instance to Figure 1, there is illustrated an apparatus for producing a sheet or mat of mineral fibers reinforced with continuous strands of yarns. The apparatus is inclusive of one or more feeders 10 which may be heated electrically or by other suitable means and from which a plurality of streams of molten glass 11 issue continuously. The streams of molten glass are acted upon by gaseous blasts issuing from jets of a blower 12, the action or impingement of the gaseous blasts upon the glass streams attenuating or drawing the glass into relatively fine fibers 13 which pass downwardly through an enclosure or hood 14 and are solidified during their passage through the hood 14. The fibers thus formed are of great length and are intermingled indiscriminately and collected near the base of the hood 14. As they are collected, the fibers double back and forth on themselves to form a web or mat in which the fibers are all individually arranged into a substantially completely haphazard pattern.

Disposed beneath the hood 14 is a fiber collecting surface preferably in the form of a conveyor 15 of the endless type and of a foraminous character. The conveyor may be mounted on suitable rollers 16 and driven continuously in a direction indicated by the arrow by a driving roller 17 actuated by a belt 18 from an electric motor 19 or other suitable source of power. The fibers 13 are forcibly deposited by the gaseous blasts emanating from the blower 12 upon the upper surface of the conveyor 15 which provides a collecting zone in which the mat is formed.

The product of the invention is inclusive of a reinforcing medium incorporated in the mat structure, the reinforcing medium being preferably in the form of continuous strands, slivers or yarns made up of relatively fine filaments of glass or other suitable material. The apparatus shown in Figure 1 is inclusive of means for incorporating the reinforcing strands or yarns in the glass fibers of the mat or sheet. To this end the hood 14 is provided with an offset portion 22 having an opening 23 in the wall thereof adjacent which is disposed a strand or yarn feeding means 25, one form of such device being illustrated in Figure 2. The reinforcing strands or yarns for the mat or sheet are prefabricated or preformed of glass filaments and a supply of such strands are contained in spool form as indicated at 26. The yarn or strand supply 26 may be mounted upon a suitable support 27 and the strand guided to the feeding device 25 by means of eyes or guides 28 and 29.

The form of feeding device illustrated in detail in Figure 2 is inclusive of a housing 32 and a cover portion 33. The housing is formed with an exit opening 34 through which the continuous strand 35 is projected, the strand passing through opening 23 and into the hood 14. The cover portion 33 is formed with an opening 37 through which the strand or yarn is admitted to the housing 32. The housing is formed with a chamber 38 to which air is admitted under pressure through a tube 39, the air stream passing through the tapered portion 40 of the exit 34 provides the propulsion means or force for feeding the strands or yarns into the hood 14. By regulating the admission of air to the chamber 38 by means (not shown) or by changing the air pressure, the rate of feed of the strand may be varied as desired. The force of the air blast ejected through the exit 34 is dissipated a short distance from the mouth of the exit and the continuous strand or yarn 35 folds back and forth as it falls or moves downwardly through the hood 14 into the blown fibers 13 in a haphazard fashion in the fibrous mass. Beneath the collecting zone or surface of the conveyor is a suction box 20 which communicates through a suction tunnel 21 with a suitable air exhausting means (not shown), the suction box serving to withdraw the vehicular gaseous blast from the hood 14 and facilitate collection and retention of the fibers and continuous strands interspersed therewith upon the upper surface of the conveyor 15. There may be one or several continuous strand feeding means associated with the hood and the continuous strands or yarns are haphazardly intermingled with the fine blown fibers 13 so that both fibers and strands form a composite mass upon the surface 15. As the conveyor 15 is being continuously moved by the motor 19, the fibers 13 and intermingled continuous strands 35 collected upon the conveyor are moved in a right hand direction as viewed in Figure 1.

As the composite mat moves from beneath the hood 14 on the conveyor the fibrous mass may be treated with a bonding or fixing agent or adhesive 42 which is usually in liquid form and may be sprayed upon the mat by means of a jet 43 connected to a reservoir or supply (not shown) of bonding material. The composite sheet or mat is conveyed over a roller 44 and around a second roller 45 which is immersed in a suitable bonding agent or medium 46 contained within a tank or receptacle 47 carried upon a support 48 forming a part of a frame structure 49. The treated mat passes out of the receptacle 47 over a roller 44' thence through a drying oven 50 mounted upon the frame 49.

Any suitable bonding material or binder may be applied to the mat or sheet structure which will sufficiently retain or fix the fibers and continuous strands in their intermingled relationship attained during the deposition of the fibers and strands in the collecting zone. Examples of suitable bonding agents or binders are various types of gums, asphaltic compounds, coal tar products, pitch, phenol formaldehyde resins, rubber, starch, sugar, gelatin, polystyrene, methyl methacrylate or like products. One purpose of the spray 43 is to "wet down" the fibers and strands so that they will adhere together in their predisposed pattern of arrangement. After this treatment the mat may be conveyed into the reservoir 46 for further and more complete impregnation by a bonding agent.

The wetting and impregnation of the mat or sheet 52 causes the fibers and continuous strands to be compacted into a relatively thin homogeneous fibrous mass of sheet formation. The finished or compact mat may be made of different thicknesses by controlling or regulating the speed of movement of the conveyor 15, the rate of formation of the blown fibers 13 and the rate of feed of the reinforcing yarns or strands 35. Hence the finished product may be varied in its physical characteristics, that is, the density and the thickness may be varied depending upon the purpose for which it is to be used by correlation of the rate of fiber and strand deposition and the rate of movement of the foraminous surface 15.

The impregnated sheet or mat 52 passes onto a second movable conveyor 53 driven by a motor 54 and which carries the impregnated sheet through the chamber 55 of the drying oven 50 so as to drive off or expel the solvent constituent of the bonding agent and to dry or thermally set or fix the bonding medium in the finished mat or sheet which is finally collected in roll form 56. A circulation of air through the chamber 55 of the drying oven is desirable and to this end there is provided a conduit 58 in communication with the inlet side of a blower 61, the conduit 58 having an air inlet 57 through the mat 52 so that fresh air entering the drying chamber 55 passes through the finished mat to chill the same and at the same time warm the air entering the drying oven 55.

Heating elements 56 are provided which serve to heat the air passing through the duct 58, the oven construction being of the character shown and described in the United States patent to Slayter, No. 2,306,347, dated December 22, 1942. The exhaust air and volatile constituents are conducted away through an exhaust stack 60.

Figure 3 illustrates a portion of the finished mat produced by the apparatus and method shown in Figure 1. The continuous strands 35 are interspersed throughout the mass of fibers 13, which are haphazardly individually arranged, the continuous strands 35 being arranged in random relationship. In this constructional assemblage of individually dispersed fibers and continuous strands or yarns, an exceedingly high tensile strength is imparted to the finished product which is many times greater than the strength of a fibrous mat without reinforcing strands. By feeding the reinforcing strands into the stream of descending fibers in the hood 14, the strand becomes buried within the mass of fibers 13 and very little of the strand is disposed on the surface of the mat.

The blown fibers 13 are of comparatively small diameters being usually from .00025 to .0008 of an inch, although fibers of different diameters may be used without departing from the spirit of the present invention. The strands employed as a reinforcing medium may be composed of many filaments of relatively fine character forming a continuous sliver or yarn which has a comparatively high tensile strength in the direction of its length. The diameters of the individual mineral or glass filaments making up the strand or yarn are usually from .0002 to .00035 of an inch in diameter. The average strand that has been found satisfactory as a reinforcing medium in the composite matted products of the invention is made up of approximately one hundred individual filaments. Two or more of these strands may be twisted together into a plyed yarn where greater reinforcement is required.

A modified form of product of the invention is illustrated in Figure 5 wherein the mass of blast-attenuated, individually arranged fibers 13' is reinforced by means including a plurality of substantially parallel strands or yarns 35'. The integrated mass of fibers and multi-filament reinforcing strands in this form of product are bonded into an integrated sheet-like mat through the use of one or more of the bonding agents hereinbefore enumerated.

Figure 4 illustrates a method and apparatus similar to that shown in Figure 1 for producing the mat or product illustrated in Figure 5. This form of apparatus is inclusive of electrically heated feeders 10' through which molten streams of glass flow to a hood 14'. The glass streams are attenuated into fibers by means of gaseous blasts projected against the molten streams of glass by a blower 11', the attenuated fibers 13' passing downwardly through a hood 14' to a collecting zone adjacent the foraminous surface of a conveyor 15'. The conveyor 15' is driven by a motor 19' in the same manner and direction as the conveyor 15 in the form of apparatus illustrated in Figure 1.

The reinforcing media in the form of strands 35' are obtained from supply spools 26' carried on suitable spindles or supports, the individual strands from the supply being directed or guided in spaced relation by means of guides or eyes 29'. The strands 35' extend across the the upper surface of the conveyor 15' as illustrated in Figure 4 and the blown fibers 13' collect upon the strands. The mass of blown fibers and substantially parallel reinforcing strands 35' form a composite sheet or mat 52'. As the assemblage of fibers and strands is moved from beneath the hood 14', a bonding agent 42' is sprayed onto the mat or mass of fibers and strands from a jet 43'.

As previously explained in connection with the process and apparatus illustrated in Figure 1, the spraying of the bonding agent upon the fibers as they move away from the hood accomplishes the function of "wetting down" the fibers and strands to a degree such that the fibers and strands will adhere in mass formation so as to enable the conveyance of the assemblage into a reservoir 47' for further impregnation by a bonding agent 46'. The sheet or mat 52' which has been thus thoroughly impregnated with bonding material is passed through the drying oven 50' wherein the binder is fixed to impart stability to the sheet.

In the form of product illustrated in Figure 5 and produced by the method and apparatus shown in Figure 4, the continuous strands 35' by being bonded to the mass of glass fibers 13' greatly increase the tensile strength of the composite product particularly in a direction longitudinally of the reinforcing strands 35'. The product shown in Figure 5 is particularly usable in applications where exceptional tensile strength in one direction is required. In this form of matted product, the length of reinforcing strands is reduced to a minimum through the parallel arrangement in the final product, thus minimizing the weight of the final product yet retaining the tensile strength of the continuous strands or yarns in the direction of their length. In the formation of this product, the density or thickness of the mass of blown fibers 13' may be varied by changing the rate of movement of the foraminous conveyor 15' or the rate of deposition of the fibers thereon.

Figure 7 illustrates a modified form of product 64 wherein a mat of short lengths of fibers or strands is produced by mechanically tearing fibers or strands from a mass of fibers or of strands of mineral or glass fibers. The fibers or strands in the mat are of substantially uniform lengths and are assembled and reinforced by means of substantially parallel continuous strands each formed of a multiplicity of relatively fine filaments of glass. The comparatively short lengths of cut fibers or filaments are indicated at 65 the continuous strands of reinforcing material being indicated at 66.

A method and apparatus of forming the product illustrated in Figure 7 is shown in Figure 6. The apparatus includes a hood or closure 68 within which is journaled a fiber picking or shredding implement 69 comprising a rotor equipped with radially extending pins 70, the rotor being mounted for rotation upon a shaft 71 which is driven by a motor or other suitable means (not shown). The hood or closure 68 is provided with an entrance slot or opening 74 through which a supply of fibers or strands of glass filaments 75 cut to desired short lengths is conveyed by means of a suitable belt conveyor 76 mounted upon supporting rollers 77 and driven by suitable means. A stationary blade 78 forms one wall of the entrance slot or opening 74 so that the fiber or filament supply 75 is successively engaged by the pins 70 which cooperate with the stationary blade 78 to tear the fibers or strands from the on-coming supply and throw them onto a collecting surface. It has been found that fibers having a diameter of about .00035 of an inch and collected into strands of one hundred or more fibers with the strands being from one to five inches in length produce a satisfactory mat structure.

Disposed adjacent the lower portion of the hood 68 is a fiber collecting and mat forming zone which includes a fiber supporting and collecting surface 80 preferably foraminous of the endless type which is supported upon and driven by suitable rollers, one of which is indicated at 81 whereby the conveyor 80 is caused to move continuously beneath the hood or closure 68 in the direction indicated by the arrow. A plurality of continuous strands of glass filaments 66 contained on spools 83 are conveyed through suitable eyes or guides 84 to space the reinforcing strands 66 laterally of the conveyor 80, the strands being fed beneath the hood 68 upon the upper surface of the conveyor 80. The cut fibers or strands 65 as they are torn from the supply 75 are deposited upon the surface 80 and upon the parallel strands 66 in random or haphazard formation. A spray of binder or bonding material 86 may be projected from a jet 87 upon the mass of cut fibers and reinforcing strands to impregnate the mass with the bonding agent. Disposed beneath the closure 68 is a receptacle 89 which is subjected to subatmospheric pressure through the use of a suitable suction means (not shown) connected with a tube 90 which facilitates the collection and retention of the cut fibers upon the foraminous surface 80 as well as to carry away the excess bonding material passing through the surface 80. The composite structure of cut fibers or strands, reinforcing strands and bonding agent are moved by the conveyor 80 through a drying oven 92 in which the binding agent is set and thus retains the mass of cut fibers and reinforcing strands or yarns in an integrated product 64. If desired, the mat may be bonded by immersion in the manner hereinbefore described in connection with the apparatus of Figures 1 and 4.

Figure 9 illustrates a further form of product 100 which is produced by assembling blast-attenuated glass fibers 101 with reinforcing strands 102 arranged in haphazard pattern in the composite product and in addition, a plurality of parallel reinforcing strands or yarns 103. A mat structure of fiber and strand formation illustrated in Figure 9 has exceptional tensile strength in all directions in the plane of the sheet or mat and increased tensile strength in the direction of the parallel reinforcing fibers 103. This form of product finds ready application in those installations where comparatively high tensile strength is required in all directions with very high tensile strength in one direction as, for example, in utilizing the product as a wrapping material for pipes and other structures wherein comparatively high tensile strength in the direction of wrapping is desirable.

Figure 8 illustrates a method and form of apparatus for producing the composite mat structure shown in Figure 9. The apparatus is inclusive of electrically heated feeders 105 through which molten glass streams flow which are acted or impinged upon by gaseous blasts from a blower 106 to attenuate or draw the molten glass into relatively fine disconnected fibers 101. The fibers pass downwardly through a hood 107, and disposed beneath the hood 107 is a mat forming zone which includes a foraminous conveyor 108 similar to the conveyor 15 shown in Figure 1. Arranged adjacent the conveyor 108 are several supply spools 109 from which the reinforcing continuous strands 103 are conveyed beneath the hood 107 upon the upper surface of the foraminous conveyor 108 in substantially parallel spaced relation. The strands 103 are suitably spaced and guided in their movement by the conveyor 108 beneath the hood by means of eyes 110.

The continuous strands 102 are introduced into the hood 107 by means of a strand feeding device 25 of the construction shown in Figure 2. The reinforcing strands 102 are obtained from a spool supply 112 and the strands are guided by a suitable eye 113 to the feeding device 25. One or more of the feeding devices may be employed, each utilizing air under pressure to project the strand or strands 102 into the hood 107. The reinforcing strands 102, as in the form of the invention shown in Figure 1, are folded back and forth in their movement downwardly through the hood 107 to form the haphazard configuration or pattern as shown in Figure 9. The composite mass of reinforcing strands and fibers may be treated with a bonding agent sprayed from a jet 111 and by immersion in a bonding agent contained in a reservoir 114, the wet mat being dried and the bonding agent fixed or hardened by passing the mat through an oven 115 in the manner hereinbefore described in connection with the apparatus shown in Figure 1.

It is to be understood that under certain conditions a thorough impregnation by immersion of the mat in a bonding agent may not be required, and in such instances the bonding of the mass of fibers and reinforcing strands or yarns may be accomplished by the spray method used alone.

Figure 10 illustrates a modified form of apparatus for introducing the continuous strands into the hood of the glass fiber attenuating means. The strand feeding means or blower 120 may be the same as that shown in Figure 2. The hood 137 of the fiber attenuating means is similar to the hood 14 but is formed with a canted wall 138 which supports one or more of the strand feeding blowers 120. A conveyor 15″ provides a collecting surface for the blast-attenuated glass fibers and the continuous strands 135 intermingled with the fibers, the conveyor moving the mass of fibers and strands beneath one or more sprays 139 which deposit a bonding material upon the fibrous mat. In this manner a reinforced bonded mat or sheet is produced which is similar to that produced by the apparatus shown in Figure 1, but with better control of the deposition of the reinforcing strand, the blowers 120 being arranged to project the strand directly onto the fiber deposition zone. Further impregnation and drying of the bonding agent may be performed in the same manner as illustrated in Figure 1.

The reinforced mat of this invention may be used as a reinforcing media for resins and plastics, as a base fabric for coated fabrics, as a base for varnished fabric in electrical insulation, and in other ways in which high tensile strength is a requisite.

It is apparent that modifications and different arrangements may be made other than is herein disclosed, the present disclosure being merely illustrative, and the invention comprehending all variations thereof within the scope of the claims.

We claim:

1. An article of manufacture including a mass of separate and individually arranged mineral fibers, and a reinforcing medium therefor including a continuous unbroken multi-filament strand of mineral fiber interspersed in and throughout the mass of fibers.

2. A product of manufacture including a mass of relatively fine individual glass fibers arranged in assembled relation; a reinforcing medium therefor including a plurality of continuous multi-filament strands of glass distributed in unsevered condition in and throughout the mass of fibers, and a bonding agent for imparting mass integrity to the fibers and strands in assembled relationship.

3. A product of manufacture including a mass of chopped glass fibers, the average length of the individual chopped fibers being less than three inches; reinforcing glass strands assembled with the mass of fibers, said strands being unbroken and each formed of a plurality of glass filaments, and an adhesive binder distributed throughout the assemblage of chopped fibers and continuous strands.

4. A product of manufacture including a comparatively thin mass of glass fibers; the individual fibers being from one to three inches in length; a plurality of reinforcing glass strands arranged in spaced relation and distributed through the mass of fibers, said strands being continuous and unbroken and each formed of a plurality of glass filaments, and a binder distributed through the assemblage of fibers and continuous strands to retain the strands in relatively fixed orientation with respect to the individual fibers.

5. A product of manufacture comprising a comparatively thin mass of mineral fibers, the diameters of individual fibers being between .00025 and .0008 of an inch; a continuous unbroken strand formed of a plurality of filaments of nonmetallic material assembled in and throughout the mass of fibers, and an adhesive distributed through the assemblage of fibers and strands for retaining the fibers and strands in fixed interrelation.

6. A product of manufacture comprising a mass of blown glass fibers, the diameters of individual fibers being between .00025 and .0008 of an inch; a continuous strand formed of a plurality of glass filaments assembled in and throughout the length of the mass of fibers in a haphazard fashion, and a bonding agent distributed through the assemblage of fibers and strand for retaining the fibers and strand in fixed interrelation.

7. A sheet-like mat comprising a mass of glass fibers, the fibers being of indiscriminate lengths; the diameters of individual fibers being between .00025 and .0008 of an inch; a continuous strand formed of a plurality of glass filaments assembled in and throughout the lengths of the mass of fibers in a haphazard fashion, and an adhesive distributed through the assemblage of fibers and strand for retaining the fibers and strand in fixed interrelation.

8. An article of manufacture including a mass of relatively fine mineral fibers of comparatively short lengths, and a reinforcing medium including continuous unbroken multi-filament strands of mineral fibers integrated in laterally spaced parallel relation in and throughout the mass of short length fibers.

9. A product of manufacture including a mass of glass fibers of comparatively short lengths arranged in haphazard relation; a reinforcing medium including a plurality of continuous multi-filament strands of glass arranged in laterally spaced, substantially parallel relation assembled with the mass of fibers and extending throughout the length of the mass, and a bonding agent for imparting mass integrity to the fibers and strands in assembled relationship.

10. The method of producing a mat of mineral fibers including the steps of forming individual mineral fibers of varying lengths; of collecting the fibers into a mass; and of assembling a continuous strand of nonmetallic reinforcing material throughout the length of the fibrous mass simultaneously with the operation of collecting the fibers into a mass.

11. The method of producing a sheet-like mat of mineral fibers including the steps of forming disconnected lengths of mineral fibers, of collecting the fibers into a mass; of assembling a continuous strand of reinforcing material in and throughout the length of the fibrous mass concomitantly with the collection of the fibers, and of introducing an adhesive into the assemblage of fibers and strand.

12. The method of producing a sheet-like mat of mineral fibers including the steps of severing fibers into relatively short lengths; of collecting the severed fibers into a mass; and of assembling a continuous unbroken strand of fibrous reinforcing material with the severed fibers simultaneously with the operation of collecting the fibers into a mass; and of introducing an adhesive into the assemblage of severed fibers and strands.

13. The method of fabricating a comparatively thin mat of fibrous materials including the steps of attenuating molten glass to form a plurality of disconnected fibers; of collecting the disconnected fibers in haphazard relation into a mass; of concomitantly assembling a continuous strand formed of a plurality of glass filaments in and extending throughout the mass of fibers during the collection thereof, and of introducing a bonding agent into the assemblage of fibers and strand to compact the same into a mat.

14. The method of fabricating a mat of fibrous materials including the steps of forming a plurality of disconnected fibers; of collecting the disconnected fibers into a mass; of assembling continuous strands formed of a plurality of glass filaments with the mass of fibers simultaneously with the collection of the fibers; and of introducing an adhesive in liquid state into the assemblage of fibers and strands to compact the same into a mat.

15. The method of producing a reinforced fibrous mat including the steps of moving of a plurality of disconnected glass fibers through a zone; of simultaneously feeding a continuous reinforcing strand preformed of a plurality of glass filaments to the zone; of collecting the fibers and strand simultaneously upon a surface, and applying a fixing agent for retaining the strand and fibers in assembled condition.

16. The method of producing a mat of fibrous character including the steps of moving a plurality of disconnected glass fibers through a zone; of simultaneously feeding a continuous strand preformed of a plurality of glass filaments to the zone; of simultaneously collecting the fibers and strand upon a surface in a manner whereby the strand is distributed through the fibers in a haphazard pattern to form a reinforcing medium effective throughout the length of the collected mass, and applying a fixing agent for retaining the strand and fibers in assembled condition.

17. The method of producing a fibrous mat including the steps of severing predetermined comparatively short lengths of mineral filaments from a supply and collecting the severed filaments; of moving continuous strands of mineral filaments into engagement with the mass of severed short length filaments during the collecting operation; and of applying an adhesive to the composite mass of severed filaments and continuous strands to maintain the severed filaments and strands in assembled relationship.

18. The method of producing a fibrous mat including the steps of severing predetermined lengths of glass filaments from a supply and collecting the severed filaments; of assembling continuous unbroken preformed strands of glass filaments with the mass of severed filaments during the collecting operation; and of applying a bonding agent to the composite mass of severed filaments and continuous strands to maintain the severed filaments and strands in assembled relationship.

19. The method of manufacturing a comparatively thin fibrous mat which comprises feeding a plurality of continuous strands preformed of glass filaments in substantially parallel spaced relation on to a surface; of simultaneously collecting a plurality of disconnected short length glass fibers upon the continuous strands, and of applying a bonding agent to the collected mass of fibers and continuous strands whereby the mass is compacted and stabilized in a sheet-like mat.

20. As an article of manufacture; a mat composed of a mass of mineral fibers individually and separately arranged throughout the mat; and a reinforcing medium therefor including a continuous unsevered multifilament strand of mineral fiber assembled in and extending throughout the length of the mass of individually and separately arranged fibers.

21. As an article of manufacture; a mat composed of a multiplicity of fine glass fibers; a substantial proportion of said fibers being individually and separately arranged throughout the mat, others of the fibers being in the form of continuous unbroken strands distributed in and extending throughout the length of the mass of individually and separately arranged fibers, and means holding said continuous strands in the mat.

22. As an article of manufacture; a mat composed of a multiplicity of fine glass fibers; a substantial proportion of said fibers being individually and separately arranged throughout the mat, others of the fibers being in the form of a plurality of continuous unbroken strands disposed in the mat; said strands being arranged in laterally spaced parallel relation and extending throughout the length of the mat.

23. As an article of manufacture; a mat including a mass of relatively fine glass fibers individually and separately arranged in the mat; a plurality of continuous unbroken strands of glass fibers disposed lengthwise of the mat extending throughout the length thereof and arranged in laterally spaced parallel relation, and means holding said continuous strands in the mat.

24. The method of producing a fibrous mat which includes the steps of collecting a multiplicity of individual glass fibers upon a linearly moving medium; of concomitantly assembling a plurality of laterally spaced continuous unbroken strands of glass fibers with said multiplicity of fibers in a manner whereby the strands are arranged in parallel relation extending throughout the length of the mat, and of applying a means to the assemblage of individual fibers and strands for holding the strands in the mat.

25. Apparatus for producing a reinforced fibrous mat including a fiber forming chamber; means for flowing a plurality of streams of fiber-forming material downwardly into the fiber forming chamber; means including a blower for directing a blast of gas generally downwardly into engagement with the streams to attenuate the latter to fibers of varying lengths; means for continuously feeding an unbroken strand of fibers of nonmetallic material into the fiber forming chamber, and a movable conveyor forming a surface upon which the attenuated fibers and unbroken strand are concomitantly collected to form a sheet-like mat.

26. Apparatus for producing a fibrous mat formed of mineral material including a fiber forming chamber; means for flowing a plurality of streams of molten mineral material downwardly into the forming chamber; means including a blower for directing a blast of gas generally downwardly into engagement with the streams to attenuate the latter into individual fibers; a movable conveyor upon which the attenuated fibers are continuously collected to form a matted body; feeding means for continuously delivering an unbroken strand of mineral fibers into the matted body during collection of the attenuated fibers upon the conveyor, said conveyor being arranged to continuously move the collected attenuated fibers and strand away from the fiber forming chamber, and means for bonding the collected fibers and strand into a sheet-like mat.

27. Apparatus for producing a fibrous mat including a fiber forming chamber; means for flowing a plurality of streams of molten glass downwardly into the chamber; a blower arranged to direct a blast of gas downwardly into the chamber into engagement with the streams to attenuate the same to individual fibers of varying lengths; a relatively movable foraminous conveyor upon which the attenuated fibers are collected to form a matted body; feeding means for delivering a plurality of continuous unbroken strands of glass fibers into the chamber for assembly in haphazard formation in the matted body of fibers, and means including a nozzle for delivering a liquid material onto the assembly of individual fibers and unbroken strands to compact the assembly to a sheet-like mat.

28. Apparatus for producing a fibrous mat at a mat forming zone including relatively movable foraminous conveyor; means for continuously delivering individual fibers attenuated from mineral material onto the conveyor; means for continuously delivering unbroken strands of mineral fibers in substantially parallel laterally spaced relation for assembly with the mass of individual fibers collected on the conveyor; means for delivering an unbroken strand of mineral fibers interjacent the mass of fibers for disposition therein in haphazard formation, and means for delivering a bonding agent onto the assemblage of individual fibers, parallel and haphazardly arranged strands to impart mass integrity thereto.

29. Apparatus for producing a sheet-like mat including a chamber; a relatively movable foraminous conveyor disposed adjacent the chamber; means for flowing streams of molten material into the chamber; means including a blower for directing a blast of gas into the chamber in engagement with the streams to attenuate the same to individual fibers and conveying the attenuated fibers onto the conveyor; strand feeding means for continuously delivering an unbroken strand of mineral fibers into the chamber for disposition in haphazard formation in and throughout the mass of fibers on the conveyor; means for feeding a plurality of strands of mineral fibers in spaced parallel relation interjacent the mass of fibers on the conveyor and disposed lengthwise thereof, and a dispensing means for delivering a bonding agent onto the assemblage of individual fibers, parallel and haphazardly arranged strands.

30. As an article of manufacture, a mat composed of glass fibers of which a substantial proportion are chopped strands of comparatively short lengths, others of the fibers being in the form of continuous unbroken strands disposed in and throughout the length of mat of chopped strands.

31. An article of manufacture formed of a mass of blown glass fibers of varying lengths assembled in haphazard orientation, and a reinforcing medium in the mass including one or more continuous unbroken multifilament strands of glass fibers assembled in and throughout the mass during the formation and collection of the blown fibers.

32. An article of manufacture formed of a mass of blown glass fibers of varying lengths assembled in haphazard orientation, a reinforcing medium in the mass including continuous unbroken multifilament strands of glass fibers dispersed in and throughout the mass during the formation and collection of the blown fibers, and a bonding material distributed in and throughout the assembly of blown fibers and strands.

33. As an article of manufacture, a mat composed of a multiplicity of fine glass fibers; a substantial proportion of the fibers being chopped fibers of an average length of less than three inches, others of the fibers being in the form of a plurality of continuous unbroken strands disposed in the mat, said strands being arranged in laterally spaced substantially parallel relation and extending throughout the length of the mat.

34. In apparatus for producing reinforced non-woven fabric which comprises a chamber for collecting staple glass fibers, a movable support disposed in said chamber upon which said glass fibers are collected, and feeding mechanism associated with said chamber and operable for concurrently introducing long continuous length threads of glass fiber into said chamber and onto said movable support so as to become intertwined and interfelted with said staple fiber disposed on said movable support.

35. As a new article of manufacture, a reinforced non-woven glass fabric comprising a web of interfelted fine staple glass fibers, said web having threads of continuous length glass fibers in the form of a thread disposed haphazardly throughout the body of said non-woven glass fabric web.

References Cited in the file of this patent

UNITED STATES PATENTS

| | | |
|---|---|---|
| 2,357,392 | Francis | Sept. 5, 1944 |
| 2,392,882 | Roberts | Jan. 15, 1946 |
| 2,428,654 | Collins | Oct. 7, 1947 |
| 2,477,555 | Roberts et al. | July 26, 1949 |
| 2,481,949 | Richardson | Sept. 13, 1949 |
| 2,528,091 | Slayter | Oct. 31, 1950 |
| 2,552,124 | Tallman | May 8, 1951 |

OTHER REFERENCES

Fiberglass Standards Supplement #CP6.C1, April 8, 1949, published by the Owens Corning Fiberglas Corporation, 1 page.